US012638867B2

(12) United States Patent
Sun et al.

(10) Patent No.: US 12,638,867 B2
(45) Date of Patent: May 26, 2026

(54) WATER PUMPING SYSTEM AND METHOD OF TROUBLESHOOTING THE SAME

(71) Applicant: Tsann Kuen (Zhangzhou) Enterprise Co., Ltd., Zhangzhou (CN)

(72) Inventors: Xiaosen Sun, Zhangzhou (CN); Shaobiao Li, Zhangzhou (CN)

(73) Assignee: TSANN KUEN (ZHANGZHOU) ENTERPRISE CO., LTD., Zhangzhou (CN)

( * ) Notice: Subject to any disclaimer, the term of this patent is extended or adjusted under 35 U.S.C. 154(b) by 420 days.

(21) Appl. No.: 18/330,186

(22) Filed: Jun. 6, 2023

(65) Prior Publication Data

US 2023/0409056 A1 Dec. 21, 2023

(30) Foreign Application Priority Data

Jun. 16, 2022 (CN) .......................... 202210679049.9

(51) Int. Cl.
*G05D 23/19* (2006.01)
*G01K 3/00* (2006.01)

(52) U.S. Cl.
CPC ......... *G05D 23/1917* (2013.01); *G01K 3/005* (2013.01)

(58) Field of Classification Search
CPC .. G05D 23/1917; G01K 3/005; F04D 27/006; F04D 29/007; F05D 2270/303; F05D 2270/80
See application file for complete search history.

(56) References Cited

U.S. PATENT DOCUMENTS

| | | | | | |
|---|---|---|---|---|---|
| 8,224,517 | B2 * | 7/2012 | Eser | ......................... | F01P 11/16 |
| | | | | | 701/31.4 |
| 8,620,516 | B2 * | 12/2013 | Anilovich | ........... | G01M 15/048 |
| | | | | | 701/34.4 |
| 9,051,930 | B2 * | 6/2015 | Stiles, Jr. | ............ | F04D 15/0077 |
| 10,619,864 | B2 * | 4/2020 | Luo | ......................... | F24H 15/37 |

(Continued)

FOREIGN PATENT DOCUMENTS

| | | | | | |
|---|---|---|---|---|---|
| CN | 105193275 | A | * | 12/2015 | |
| CN | 106970662 | A | * | 7/2017 | .............. F28F 27/00 |

(Continued)

*Primary Examiner* — Yongjia Pan

(74) *Attorney, Agent, or Firm* — Birch, Stewart, Kolasch & Birch, LLP

(57) ABSTRACT

A method of troubleshooting a water pumping system including a controller, a water pump, a heater and a temperature sensor is provided. The method includes the controller controlling heating up of the heater, the temperature sensor detecting a temperature of the heater, the controller controlling the water pump to pump water through the heater with a default water pumping power, the controller determining whether the temperature of the heater after the water pump has started operating for a pre-determined period is less than or equal to a pre-determined overheating temperature, and the controller controlling the water pump with the controller to pump water through the heater with an alternative water pumping power that is greater than the default water pumping power when the temperature of the heater after the water pump has started operating for the pre-determined period is greater than the pre-determined overheating temperature.

20 Claims, 5 Drawing Sheets

(56)       References Cited

U.S. PATENT DOCUMENTS

| | | | | |
|---|---|---|---|---|
| 11,649,760 | B1 * | 5/2023 | Dudar .................... | G01K 3/005 |
| | | | | 700/282 |
| 2008/0044293 | A1 * | 2/2008 | Hanke ................. | A01K 63/047 |
| | | | | 417/14 |
| 2009/0312879 | A1 * | 12/2009 | Quah ...................... | A47J 31/56 |
| | | | | 99/323.3 |
| 2010/0206869 | A1 * | 8/2010 | Nelson ................. | F24H 15/136 |
| | | | | 392/441 |
| 2013/0048669 | A1 * | 2/2013 | Stolk ................... | F24H 15/219 |
| | | | | 222/113 |
| 2014/0272025 | A1 * | 9/2014 | Wheeler .............. | A47J 31/469 |
| | | | | 99/283 |
| 2016/0007798 | A1 * | 1/2016 | Jimenez ................. | A47J 31/56 |
| | | | | 99/283 |
| 2016/0265793 | A1 * | 9/2016 | Copeland ................. | F24B 1/02 |
| 2017/0325294 | A1 * | 11/2017 | Kim ...................... | F24H 15/238 |
| 2020/0362800 | A1 * | 11/2020 | Keblusek ............. | F02D 41/005 |

FOREIGN PATENT DOCUMENTS

| | | | | | |
|---|---|---|---|---|---|
| CN | 119915013 | A | * | 5/2025 | |
| WO | WO-2016080039 | A1 | * | 5/2016 | .............. A47J 27/21 |

* cited by examiner

WATER PUMPING SYSTEM AND METHOD OF TROUBLESHOOTING THE SAME

CROSS-REFERENCE TO RELATED APPLICATION

This application claims priority to Chinese Invention Patent Application No. 202210679049.9, filed on Jun. 16, 2022.

FIELD

The disclosure relates to a water pumping system and a method of troubleshooting the same, and more particularly to a water pumping system for electric appliances that require heating up of water and a method of troubleshooting the same.

BACKGROUND

A conventional water pumping system is a fundamental part of an electric appliance, such as a coffee machine, a steam iron, or a tea maker. The conventional water pumping system generally includes a heater, a water pump configured to pump water through the heater, and a controller configured to control the water pump.

When manufacturing the aforementioned electric appliance, it is common to add water into the water pump to ensure that the water pump may operate with a stable water pressure when the electric appliance is turned on. However, if the electric appliance has not been used for a long time, the water inside the water pump may evaporate, and when the water pump is turned on again, the water pump may have insufficient inner pressure or increased frictions between inner parts of the water pump because of dryness, causing the water pump unable to function properly. This issue often leads to customers mistaking the electric appliance as broken and sending the electric appliance back for repairs, causing inconvenience for both the manufacturer and the customers.

SUMMARY

Therefore, an object of the disclosure is to provide a water pumping system and a method of troubleshooting the water pumping system that can alleviate at least one of the drawbacks of the prior art.

According to the disclosure, a method of troubleshooting a water pumping system including a controller, a water pump, a heater and a temperature sensor is provided. The method includes steps of the controller controlling heating up of the heater, the temperature sensor detecting a temperature of the heater, the controller controlling the water pump to pump water through the heater with a default water pumping power when the temperature detected by the temperature sensor has reached a pre-determined operating temperature, the controller determining whether the temperature of the heater is less than or equal to a pre-determined overheating temperature after the water pump has started operating for a pre-determined period, and the controller controlling the water pump to pump water through the heater with an alternative water pumping power that is greater than the default water pumping power when the controller determines that the temperature of the heater after the water pump has started operating for the pre-determined period is greater than the pre-determined overheating temperature.

According to the disclosure, a water pumping system includes a heater, a temperature sensor configured to detect a temperature of the heater, a water pump configured to pump water through the heater, and a controller electrically connected to the heater, the temperature sensor and the water pump. The controller is configured to control the heater to heat up, control the water pump to pump water through the heater with a default water pumping power when the temperature detected by the temperature sensor has reached a pre-determined operating temperature, determine whether the temperature of the heater after the water pump has started operating for a pre-determined period is less than or equal to a pre-determined overheating temperature, control the water pump to continue pumping water with the default water pumping power when it is determined that the temperature of the heater after the water pump has started operating for the pre-determined period is less than or equal to the pre-determined overheating temperature, and control the water pump to pump water through the heater with an alternative water pumping power that is greater than the default water pumping power when it is determined that the temperature of the heater after the water pump has started operating for the pre-determined period is greater than the pre-determined overheating temperature.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
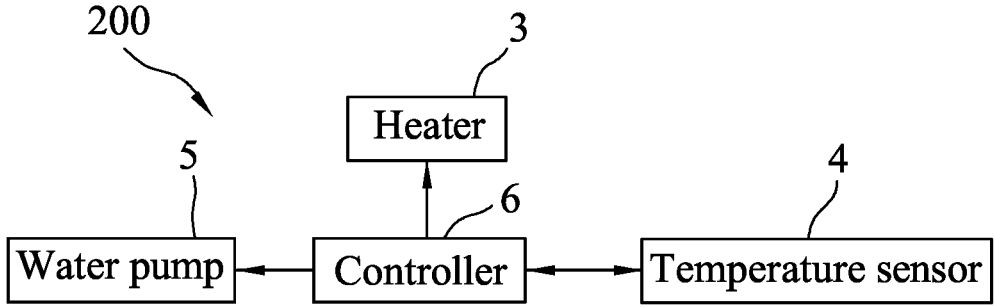
FIG. 1 is a block diagram illustrating a water pumping system according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Referring to FIG. 1, a water pumping system 200 according to an embodiment of the disclosure is provided. The water pumping system 200 is adapted to be installed in an electric appliance (e.g., a coffee machine, a steam iron, or a tea maker) that requires heating up of water, and is connected to a water tank (not shown) of the electric appliance.

The water pumping system 200 includes a heater 3 configured to heat up water from the water tank, a temperature sensor 4 configured to detect a temperature of the heater 3, a water pump 5 connected to the heater 3 and configured to pump water through the heater 3, and a controller 6 electrically connected to the heater 3, the temperature sensor 4 and the water pump 5.

The controller 6 includes, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), a system on a chip (SoC), etc.

The controller 6 has a first mode and a second mode. In the first mode, the controller 6 controls the water pump 5 to pump water through the heater 3 with a default water pumping power. In the second mode, the controller 6 controls the water pump 5 to pump water through the heater 3 with an alternative water pumping power that is greater than the default water pumping power for troubleshooting the water pump 5. According to some embodiments, an amount of water pumped by the water pump 5 per unit time with the default water pumping power is 20% to 30% of an amount of water pumped by the water pump 5 per unit time with the alternative water pumping power. In this embodiment, the water pump 5 operating with the default water pumping power pumps water with a mass flow rate of 10-18 g/sec, and the water pump 5 operating with the alternative water pumping power pumps water with a mass flow rate of 50-60 g/sec. The alternative water pumping power is the maximum power (e.g., rated power) of the water pump 5.

Figure 2:
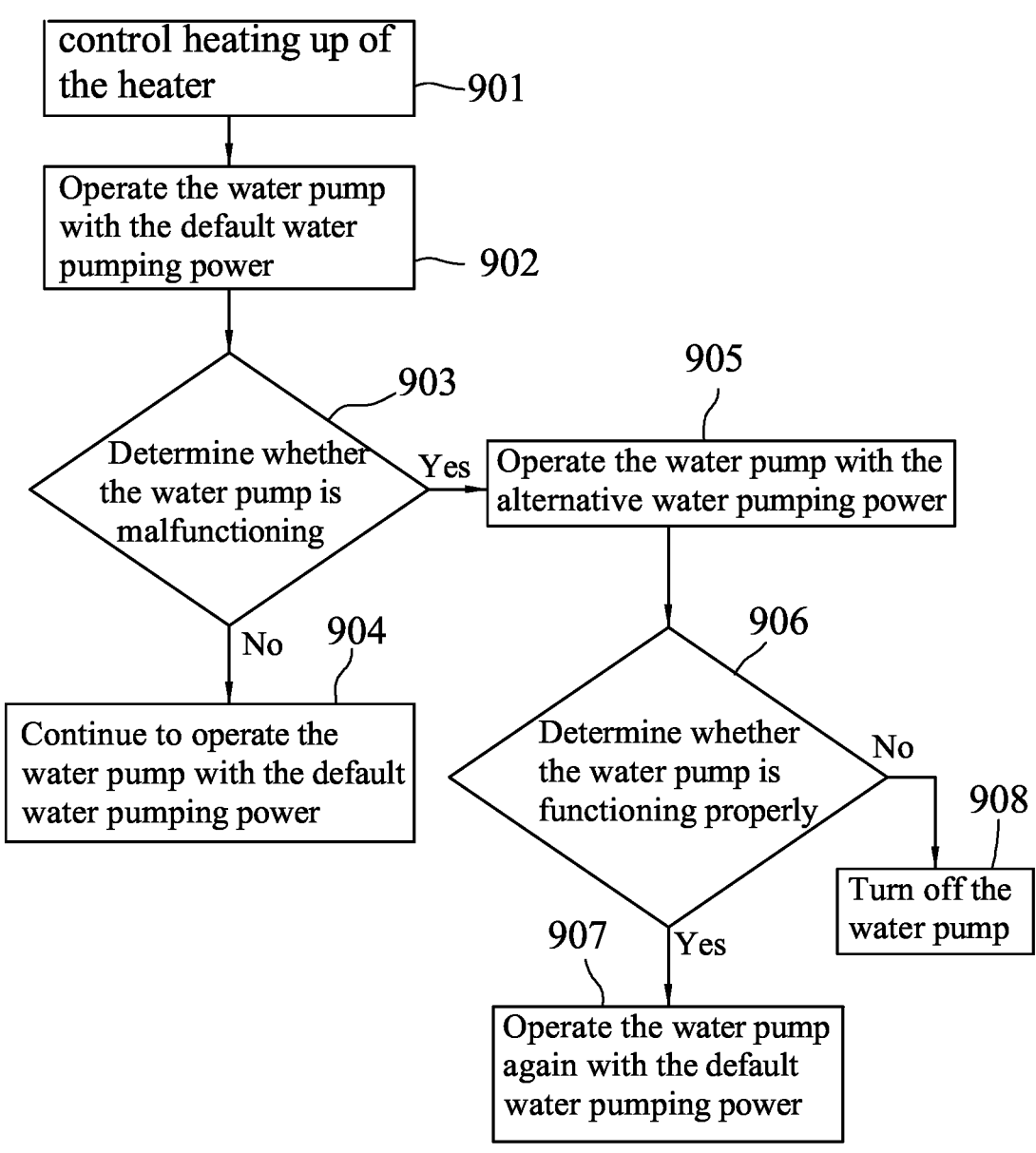
FIG. 2 is a flow chart illustrating a method of troubleshooting the water pumping system according to an embodiment of the disclosure.

Further referring to FIG. 2, when a heating process for heating up water is initiated by the water pumping system 200, the water pumping system 200 will perform a method of troubleshooting. The method of troubleshooting according to this embodiment includes steps of 901 to 908.

In step 901, the controller 6 controls the heater 3 to start heating up and controls the temperature sensor 4 to start detecting the temperature of the heater 3 when the heating process is initiated. Furthermore, the controller 6 determines whether the temperature of the heater 3 detected by the temperature sensor 4 has reached a pre-determined operating temperature.

In step 902, when it is determined that the temperature detected by the temperature sensor 4 has reached the pre-determined operating temperature, the controller 6 operates in the first mode to control the water pump 5 to start pumping water to the heater 3 with the default water pumping power, and controls the temperature sensor 4 to continuously detect changes in the temperature of the heater 3.

In step 903, after the water pump 5 has started operating for a first pre-determined period with the default water pumping power, the controller 6 analyzes the temperature of the heater 3 detected by the temperature sensor 4 to determine whether the water pump 5 is malfunctioning. Specifically, the controller 6 determines whether the water pump 5 is malfunctioning by determining whether the temperature of the heater 3 after the water pump 5 has started operating for the first pre-determined period is less than or equal to a pre-determined overheating temperature. In this embodiment, the controller 6 determines whether the temperature of the heater 3 is less than or equal to the pre-determined overheating temperature during a checking period that is a time period starting from when the water pump has started operating, and that is longer than the first pre-determined period. In this embodiment, the pre-determined operating temperature is equal to the pre-determined overheating temperature.

Figure 3:
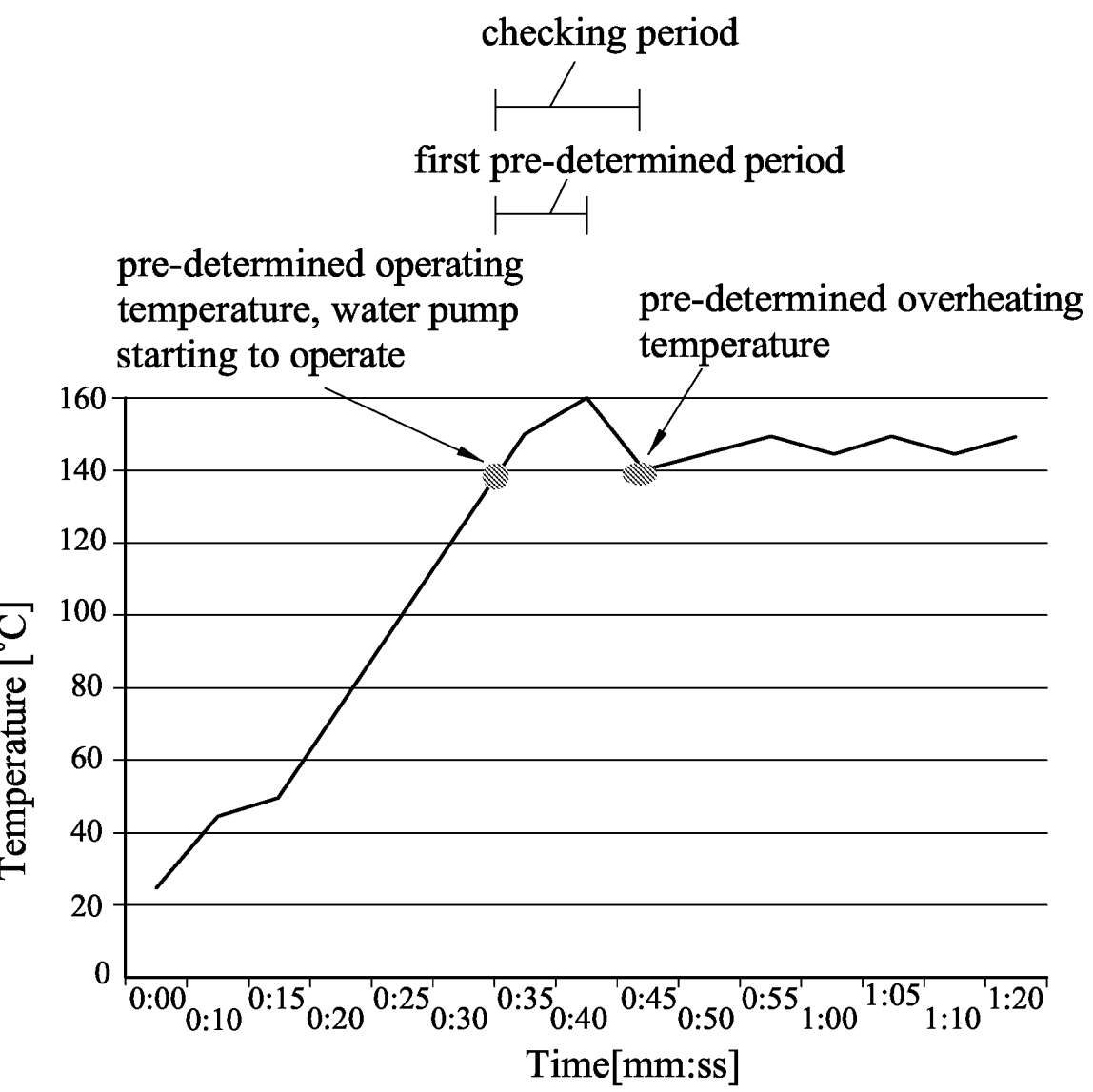
FIG. 3 is a plot illustrating change in temperature over time of a water pump functioning properly.
Figure 4:
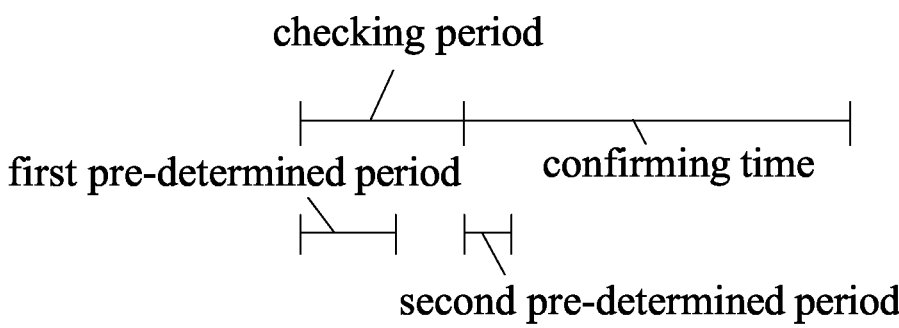
FIG. 4 is a plot illustrating change in temperature over time of a water pump malfunctioning.
Figure 4:
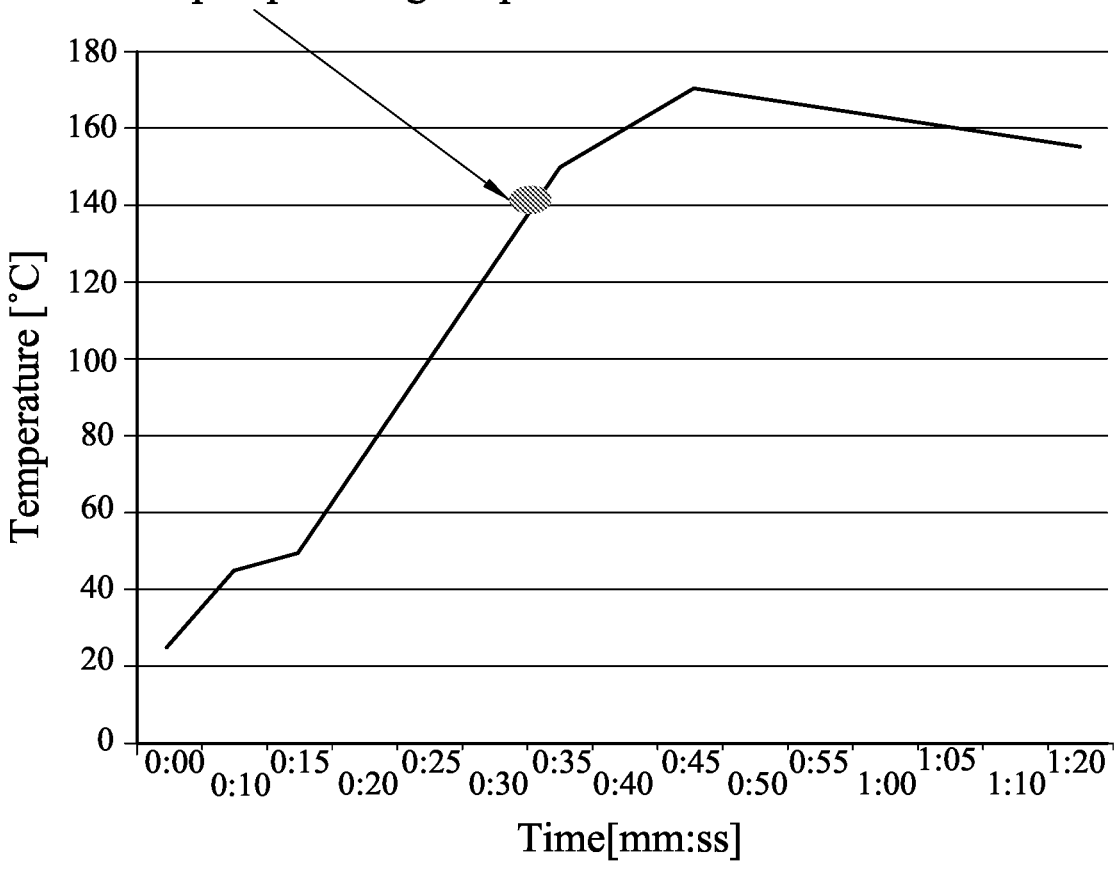
Figure 5:
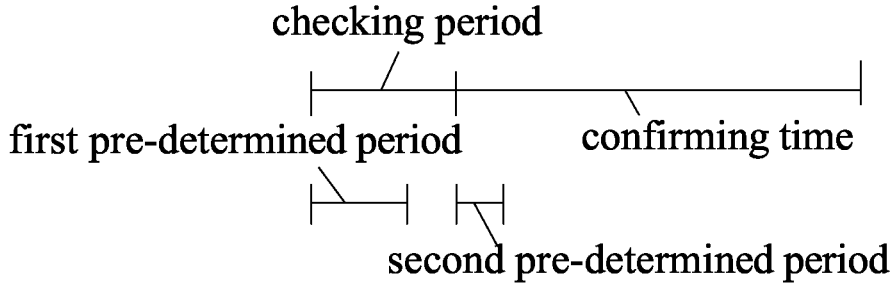
FIG. 5 is a plot illustrating change in temperature over time of a water pump that appears to be malfunctioning but resumes to operating normally after using the method of troubleshooting according to the disclosure.
Figure 5:
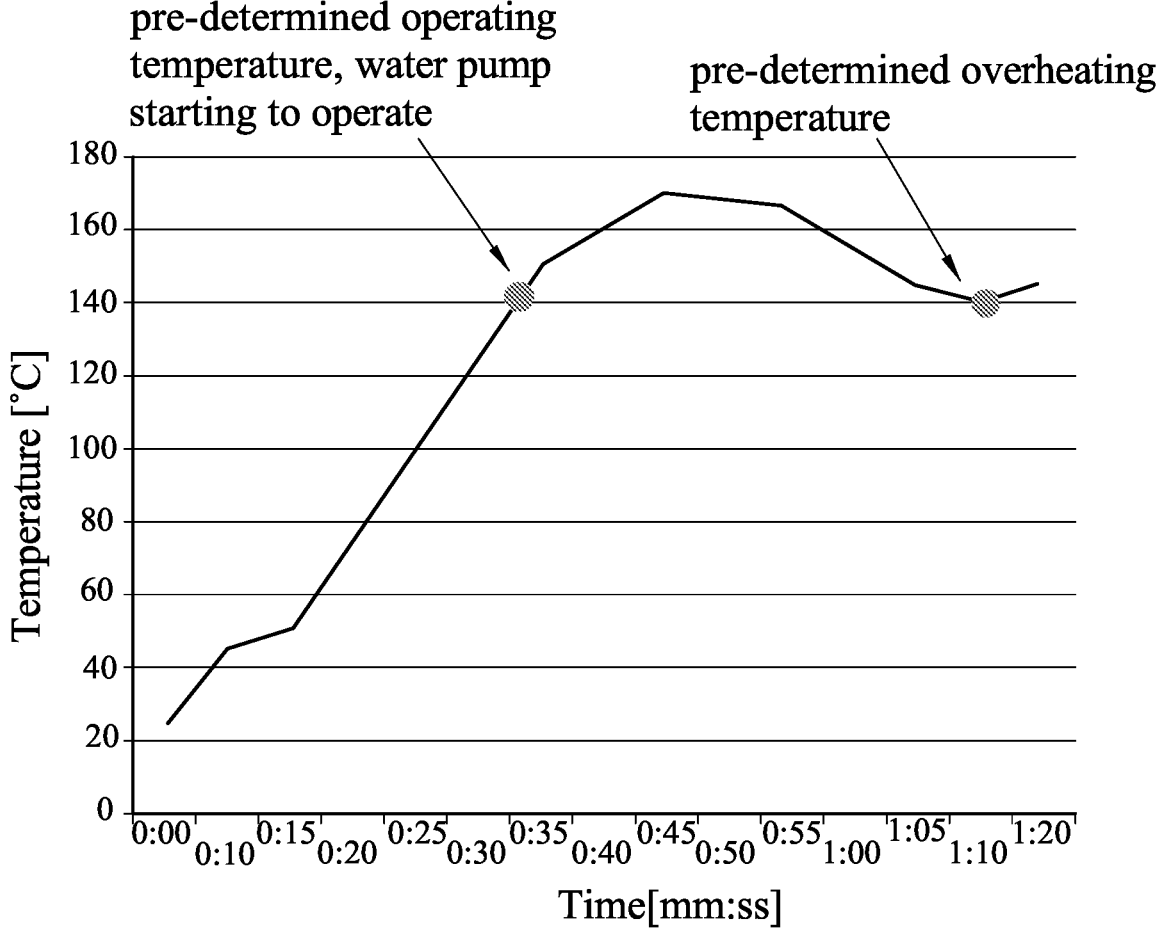

When the water pump 5 starts operating, if the water pump 5 is functioning properly, after the first pre-determined period, the water being pumped into the heater 3 will make the temperature of the heater 3 drop to less than or equal to the pre-determined overheating temperature within the checking period. For example, the water pump 5 starts to operate when the temperature of the heater 3 has reached 140° C. (the pre-determined operating temperature), and after operating for the first pre-determined period, the temperature sensor 4 detects that the temperature of the heater 3 has dropped to 140° C. (the pre-determined overheating temperature), meaning that the water pump 5 is functioning properly (as shown in FIG. 3). If the water pump 5 is malfunctioning (i.e., unable to pump enough water into the heater 3), after the first pre-determined period, the temperature of the heater 3 will not drop to less than or equal to the pre-determined overheating temperature within the checking period, and the temperature may continue to rise during the checking period (as shown in FIGS. 4 and 5).

Thus, in step 903, if the controller 6 determines that the temperature of the heater 3 has dropped to less than or equal to the pre-determined overheating temperature within the checking period, then the controller 6 determines that the water pump 5 is functioning properly and the flow proceeds to step 904; otherwise, the controller 6 determines that the water pump 5 is malfunctioning and the flow proceeds to step 905.

In some embodiments, the controller 6 is configured to determine whether the temperature of the heater 3 is less than or equal to the pre-determined overheating temperature after the water pump 5 has operated for the first pre-determined period (i.e., the first pre-determined period has elapsed). In other embodiments, the controller 6 is configured to, during the first pre-determined period, repeatedly determine whether the temperature of the heater 3 is less than or equal to the pre-determined overheating temperature, and then implement step 904 once determining that the temperature of the heater 3 is less than or equal to the pre-determined overheating temperature.

In step 904, the controller 6 controls the water pump 5 to continue pumping water with the default water pumping power until the heating process ends.

In step 905, the controller 6 operates in the second mode to control the water pump 5 to pump water through the heater 3 with the alternative water pumping power that is greater than the default water pumping power.

In step 906, after the water pump 5 has started pumping water with the alternative water pumping power for a second pre-determined period, the controller 6 analyzes the temperature of the heater 3 detected by the temperature sensor 4 to determine whether the water pump 5 is functioning properly. Specifically, the controller 6 determines whether the water pump 5 is functioning properly by determining whether the temperature of the heater 3 is less than or equal to the pre-determined overheating temperature.

If the temperature of the heater 3 has changed to less than or equal to the pre-determined overheating temperature within a confirming time, it will be determined that the water pump 5 has resumed normal operation and is functioning properly, and the flow proceeds to step 907; otherwise, the water pump 5 is determined to be still malfunctioning and the flow proceeds to step 908.

For example, the water pump 5 starts to operate when the temperature of the heater 3 has reached 140° C. (the pre-determined operating temperature), and after the water pump 5 starts operating for the first pre-determined period, the temperature sensor 4 detects that the temperature of the heater 3 has not dropped to or below 140° C. (the pre-determined overheating temperature), the water pump 5 would then pump water through the heater 3 with the alternative water pumping power for the second pre-determined period (e.g., 3 to 5 seconds). If the temperature sensor 4 detects that the temperature of the heater 3 has dropped to or below 140° C. (the pre-determined overheating temperature) within the confirming time, the water pump 5 would be determined as functioning properly (as shown in FIG. 5); otherwise, if the temperature sensor 4 detects that the temperature of the heater 3 still has not dropped to or below 140° C. (the pre-determined overheating temperature), the water pump 5 would be determined as malfunctioning (as shown in FIG. 4).

In step 907, the controller 6 controls the water pump 5 to pump water through the heater 3 with the default water pumping power again until the heating process ends.

In step 908, the controller 6 turns off the heater 3 and the water pump 5, and sends out an alert that signals malfunctioning of the water pump 5. For example, the water pumping system 200 may further include an output unit (e.g., a display, a lighting device, an audio device, or a combination thereof) electrically connected to the controller 6 for receiving and outputting the alert in the form of a message, light, sound or a combination thereof.

In summary, by using the method of troubleshooting the water pumping system 200 in this disclosure, in case that the water inside the water pump 5 has evaporated because the water pumping system 200 installed in an electric appliance has not been used for a long time, which causes the water pump 5 to malfunction when the water pumping system 200 is turned on again, this method may effectively troubleshoot by increasing the operating power of the water pump 5. If the water pump 5 continues to experience malfunctions after using this method, a user may then be certain that the water pump 5 is really broken, and the controller 6 will send out an alert message reminding the user to send back the electric appliance for repairs. Thus, the water pumping system 200 and the troubleshooting method according to this disclosure may effectively troubleshoot the water pump 5 of an electric appliance that has not been used for a long time.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of troubleshooting a water pumping system, the water pumping system including a controller, a water pump, a heater and a temperature sensor, the method comprising steps of:

the controller controlling heating up of the heater;

the temperature sensor detecting a temperature of the heater;

when the temperature detected by the temperature sensor has reached a pre-determined operating temperature, the controller controlling the water pump to pump water through the heater with a default water pumping power;

the controller determining whether the temperature of the heater after the water pump has started operating for a first pre-determined period is less than or equal to a pre-determined overheating temperature; and when it is determined that the temperature of the heater after the water pump has started operating for the first pre-determined period is greater than the pre-determined overheating temperature, the controller controlling the water pump to pump water through the heater with an alternative water pumping power that is greater than the default water pumping power, wherein the step of controlling the water pump to pump water through the heater with the alternative water pumping power is to pump water in a manner that an amount of water pumped by the water pump per unit time with the default water pumping power is 20% to 30% of an amount of water pumped by the water pump per unit time with the alternative water pumping power.

2. The method as claimed in claim 1, wherein the step of determining whether the temperature of the heater after the water pump has started operating for the first pre-determined period is less than or equal to a pre-determined overheating temperature is to be implemented by one of:

after the first pre-determined period has elapsed, determining whether the temperature of the heater is less than or equal to the pre-determined overheating temperature; and during the first pre-determined period, repeatedly determining whether the temperature of the heater is less than or equal to the pre-determined overheating temperature.

3. The method as claimed in claim 1, wherein the step of determining whether the temperature of the heater after the water pump has started operating for the first pre-determined period is less than or equal to a pre-determined overheating temperature is to, during a checking period, determine whether the temperature of the heater is less than or equal to the pre-determined overheating temperature, where the checking period is a time period starting from when the water pump has started operating, and is longer than the first pre-determined period.

4. The method as claimed in claim 1, further comprising a step of, when it is determined that the temperature of the heater after the water pump has started operating for the first pre-determined period is less than or equal to the pre-determined overheating temperature, the controller controlling the water pump to continue pumping water with the default water pumping power.

5. The method as claimed in claim 1, further comprising a step of, after the water pump has started pumping water with the alternative water pumping power for a second pre-determined period, the controller determining whether the temperature of the heater is less than or equal to the pre-determined overheating temperature.

6. The method as claimed in claim 5, further comprising steps of:

when it is determined, after the water pump has started pumping water with the alternative water pumping power for the second pre-determined period, that the temperature of the heater is less than or equal to the pre-determined overheating temperature, the controller controlling the water pump to pump water through the heater with the default water pumping power again; and when it is determined, after the water pump has started pumping water with the alternative water pumping power for the second pre-determined period, that the temperature of the heater is greater than the pre-determined overheating temperature, the controller turning the water pump off.

7. The method as claimed in claim 5, wherein, in the step of determining whether the temperature of the heater after the water pump has started pumping water with the alternative water pumping power for the second pre-determined period is less than or equal to the pre-determined overheating temperature, the second pre-determined period is 3 to 5 seconds.

8. The method as claimed in claim 1, wherein the pre-determined overheating temperature is equal to the pre-determined operating temperature.

9. The method as claimed in claim 1, wherein the step of controlling the water pump to pump water through the heater with the default water pumping power is to pump water with a mass flow rate of 10-18 g/sec, and the step of controlling the water pump to pump water through the heater with the alternative water pumping power is to pump water with a mass flow rate of 50-60 g/sec.

10. The method as claimed in claim 1, wherein the alternative water pumping power is a maximum power of the water pump.

11. A water pumping system comprising:

a heater;

a temperature sensor configured to detect a temperature of the heater;

a water pump configured to pump water through the heater; and a controller electrically connected to the heater, the temperature sensor and the water pump, the controller being configured to control heating up of the heater, when the temperature detected by the temperature sensor has reached a pre-determined operating temperature, control the water pump to pump water through the heater with a default water pumping power, determine whether the temperature of the heater after the water pump has started operating for a first pre-determined period is less than or equal to a pre-determined overheating temperature, when it is determined that the temperature of the heater after the water pump has started operating for the first pre-determined period is less than or equal to the pre-determined overheating temperature, control the water pump to continue pumping water with the default water pumping power, and when it is determined that the temperature of the heater after the water pump has started operating for the first pre-determined period is greater than the pre-determined overheating temperature, control the water pump to pump water through the heater with an alternative water pumping power that is greater than the default water pumping power, wherein the controller is configured to control the water pump in a manner that an amount of water pumped by the water pump per unit time with the default water pumping power is 20% to 30% of an amount of water pumped by the water pump per unit time with the alternative water pumping power.

12. The water pumping system as claimed in claim 11, wherein the controller is configured to perform one of:

after the first pre-determined period has elapsed, determine whether the temperature of the heater is less than or equal to the pre-determined overheating temperature; and during the first pre-determined period, repeatedly determine whether the temperature of the heater is less than or equal to the pre-determined overheating temperature.

13. The water pumping system as claimed in claim 11, wherein the controller is configured to, during a checking period, determine whether the temperature of the heater detected by the temperature sensor is less than or equal to the pre-determined overheating temperature, where the checking period is a time period starting from when the water pump has started operating, and is longer than the first pre-determined period.

14. The water pumping system as claimed in claim 11, wherein the pre-determined overheating temperature is equal to the pre-determined operating temperature.

15. The water pumping system as claimed in claim 11, wherein the controller is configured to control the water pump to pump water through the heater with the alternative water pumping power for a second pre-determined period that is 3 to 5 seconds.

16. The water pumping system as claimed in claim 12, wherein the controller is configured to control the water pump operating with the default water pumping power to pump water with a mass flow rate of 10-18 g/see, and to control the water pump operating with the alternative water pumping power to pump water with a mass flow rate of 50-60 g/sec.

17. The water pumping system as claimed in claim 11, wherein the alternative water pumping power is a maximum power of the water pump.

18. The water pumping system as claimed in claim 11, wherein, after the water pump has started pumping water with the alternative water pumping power for a second pre-determined period, the controller is further configured to:

determine whether the temperature of the heater is less than or equal to the pre-determined overheating temperature;

when it is determined, after the water pump has started pumping water with the alternative water pumping power for the second pre-determined period, that the temperature of the heater is less than or equal to the pre-determined overheating temperature, control the water pump to pump water through the heater with the default water pumping power again; and when it is determined, after the water pump has started pumping water with the alternative water pumping power for the second pre-determined period, that the temperature of the heater is larger than the pre-determined overheating temperature, turning the water pump off.

19. A water pumping system comprising:

a heater;

a temperature sensor configured to detect a temperature of the heater;

a water pump configured to pump water through the heater; and a controller electrically connected to the heater, the temperature sensor and the water pump, the controller being configured to control heating up of the heater, when the temperature detected by the temperature sensor has reached a pre-determined operating temperature, control the water pump to pump water through the heater with a default water pumping power, determine whether the temperature of the heater after the water pump has started operating for a first pre-determined period is less than or equal to a pre-determined overheating temperature, when it is determined that the temperature of the heater after the water pump has started operating for the first pre-determined period is less than or equal to the pre-determined overheating temperature, control the water pump to continue pumping water with the default water pumping power, and when it is determined that the temperature of the heater after the water pump has started operating for the first pre-determined period is greater than the pre-determined overheating temperature, control the water pump to pump water through the heater with an alternative water pumping power that is greater than the default water pumping power, wherein, after the water pump has started pumping water with the alternative water pumping power for a second pre-determined period, the controller is further configured to determine whether the temperature of the heater is less than or equal to the pre-determined overheating temperature, when it is determined, after the water pump has started pumping water with the alternative water pumping power for the second pre-determined period, that the temperature of the heater is less than or equal to the pre-determined overheating temperature, control the water pump to pump water through the heater with the default water pumping power again, and when it is determined, after the water pump has started pumping water with the alternative water pumping power for the second pre-determined period, that the temperature of the heater is larger than the pre-determined overheating temperature, turning the water pump off.

20. The water pumping system as claimed in claim 19, wherein the controller is configured to perform one of:

after the first pre-determined period has elapsed, determine whether the temperature of the heater is less than or equal to the pre-determined overheating temperature; and during the first pre-determined period, repeatedly determine whether the temperature of the heater is less than or equal to the pre-determined overheating temperature.

* * * * *